B. R. CORLEY & R. TURNER.
EMBOSSING AND PRINTING MACHINE.
APPLICATION FILED APR. 24, 1918.
1,299,133.
Patented Apr. 1, 1919.
8 SHEETS—SHEET 7.
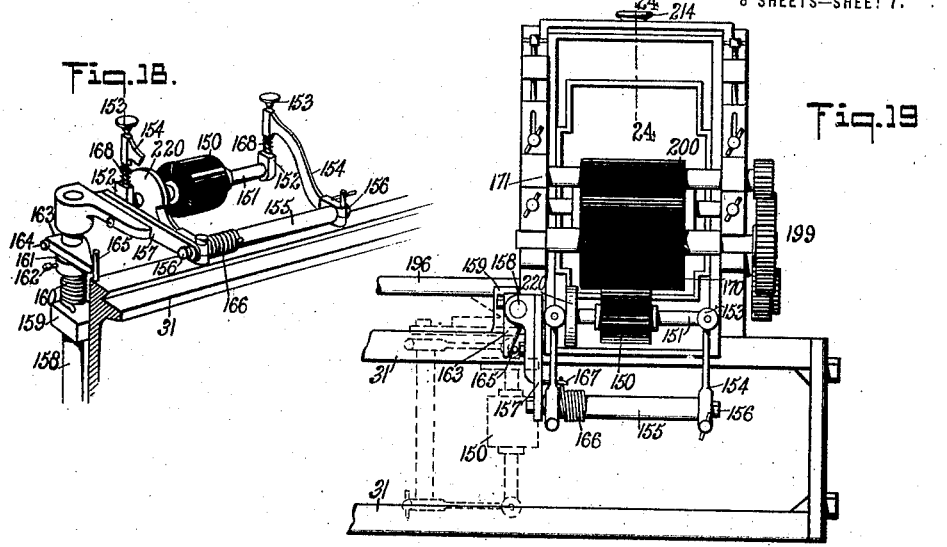
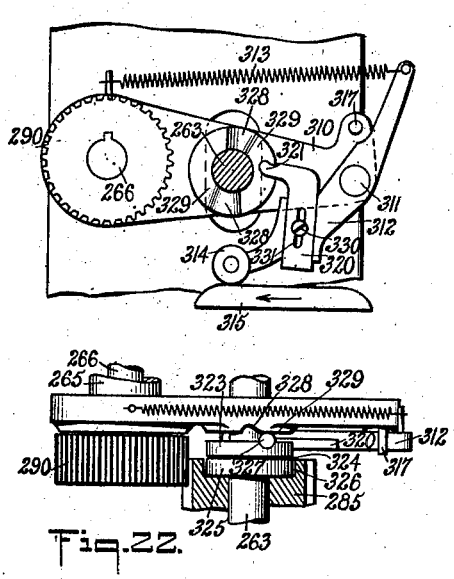
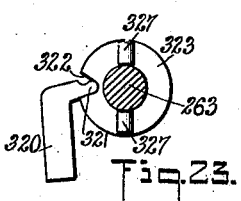
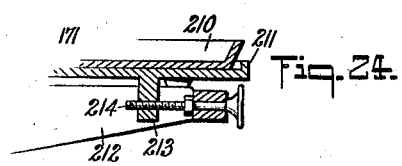
WITNESSES
INVENTORS
B.R.Corley
R.Turner
BY
ATTORNEYS

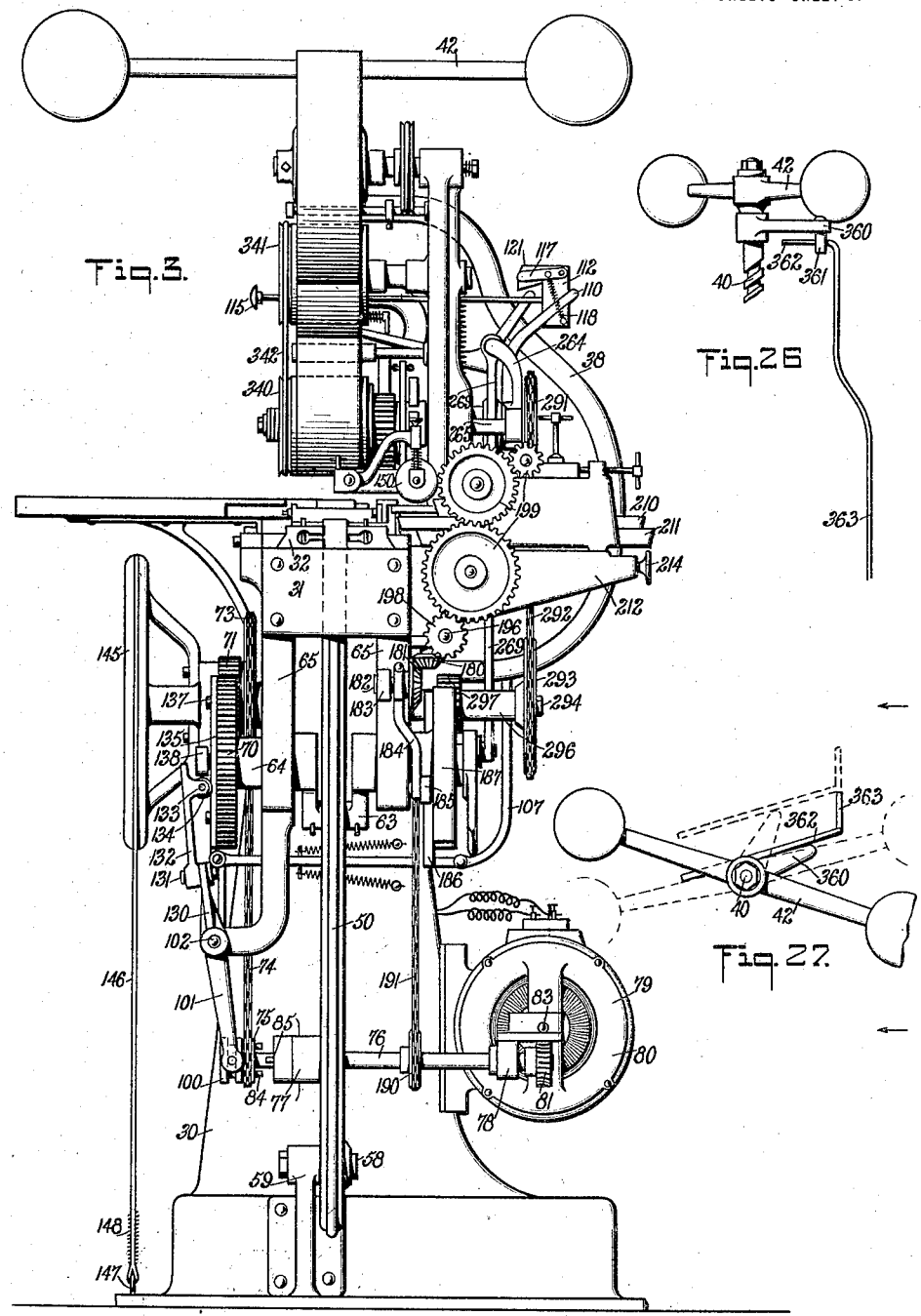

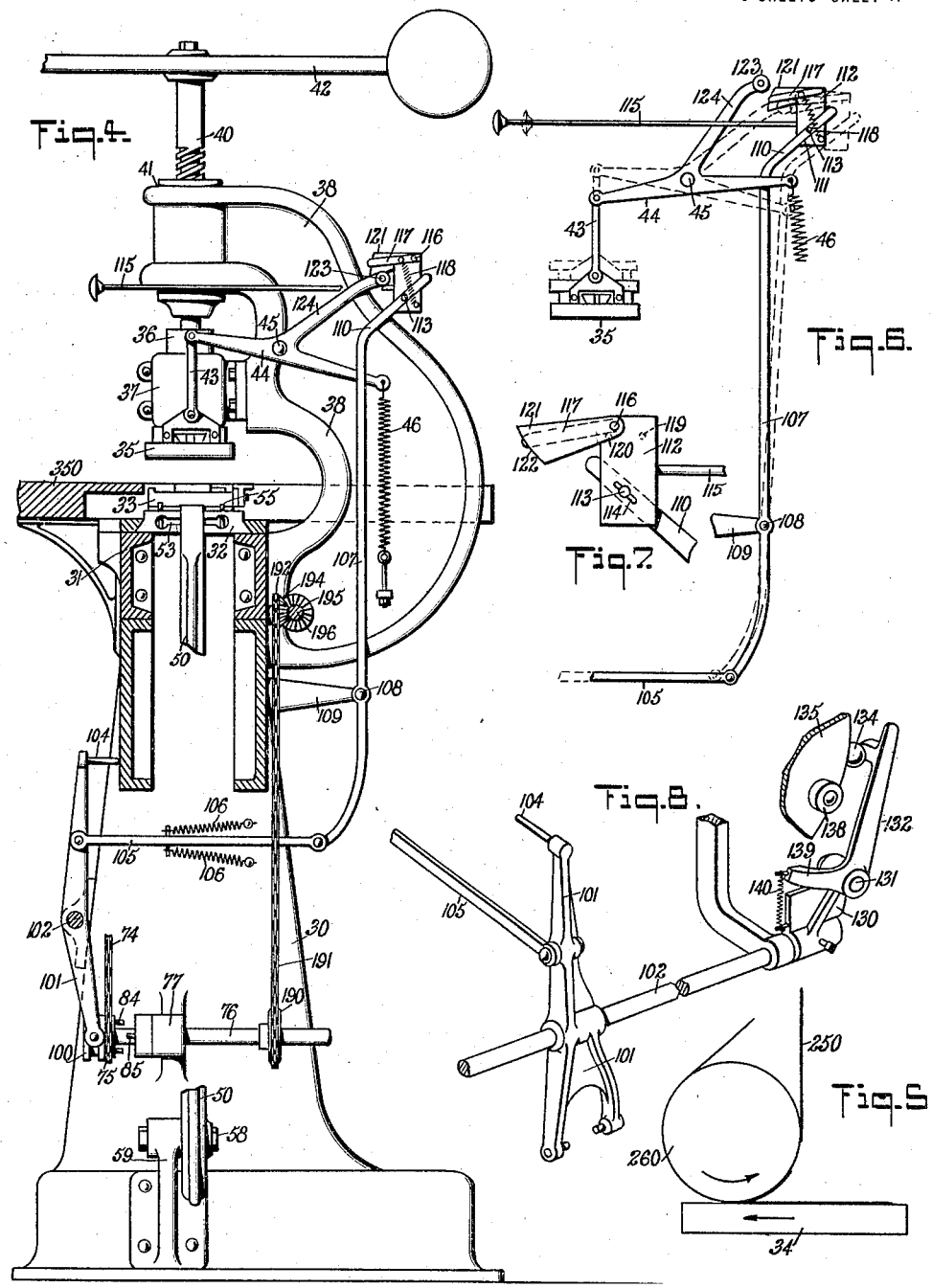

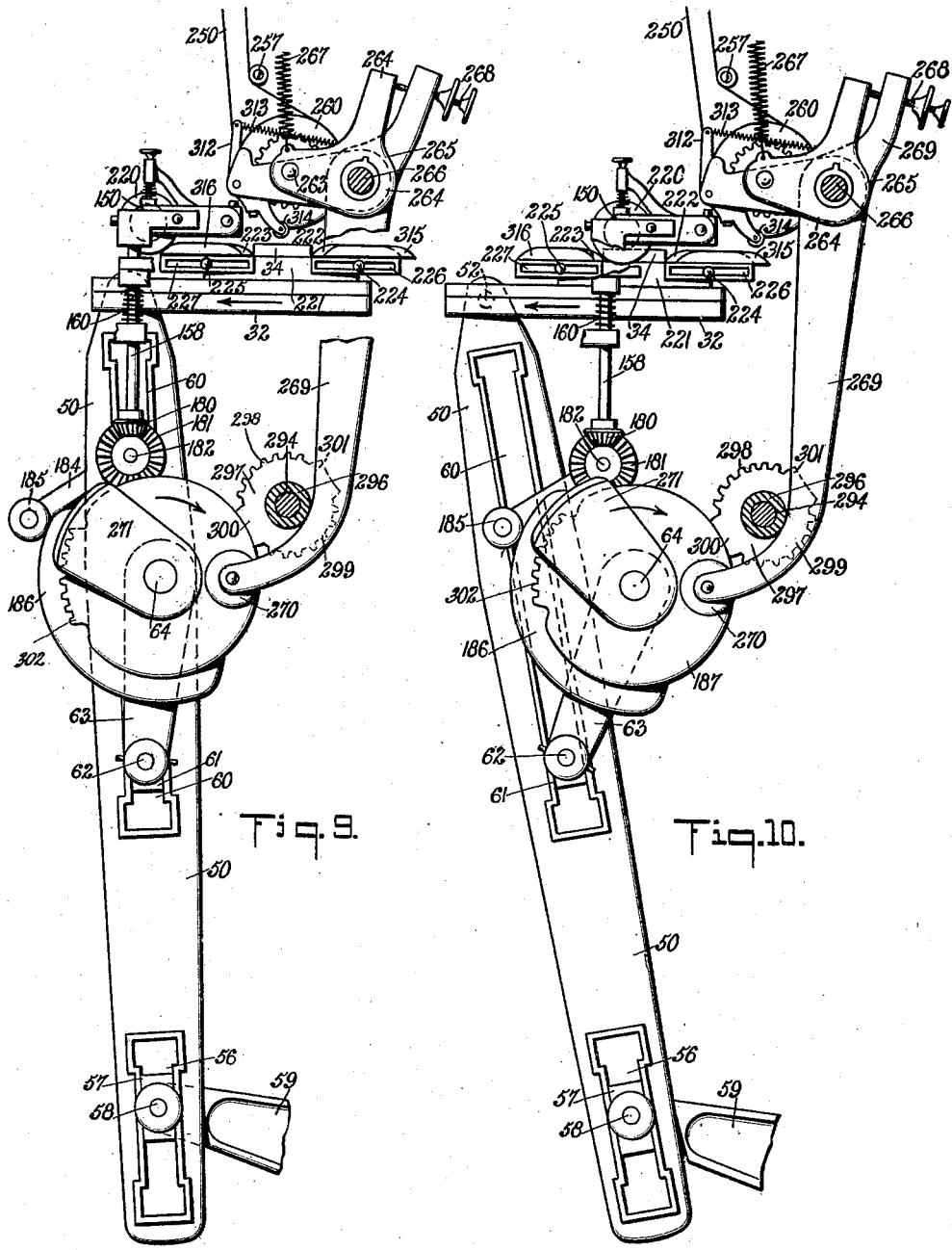

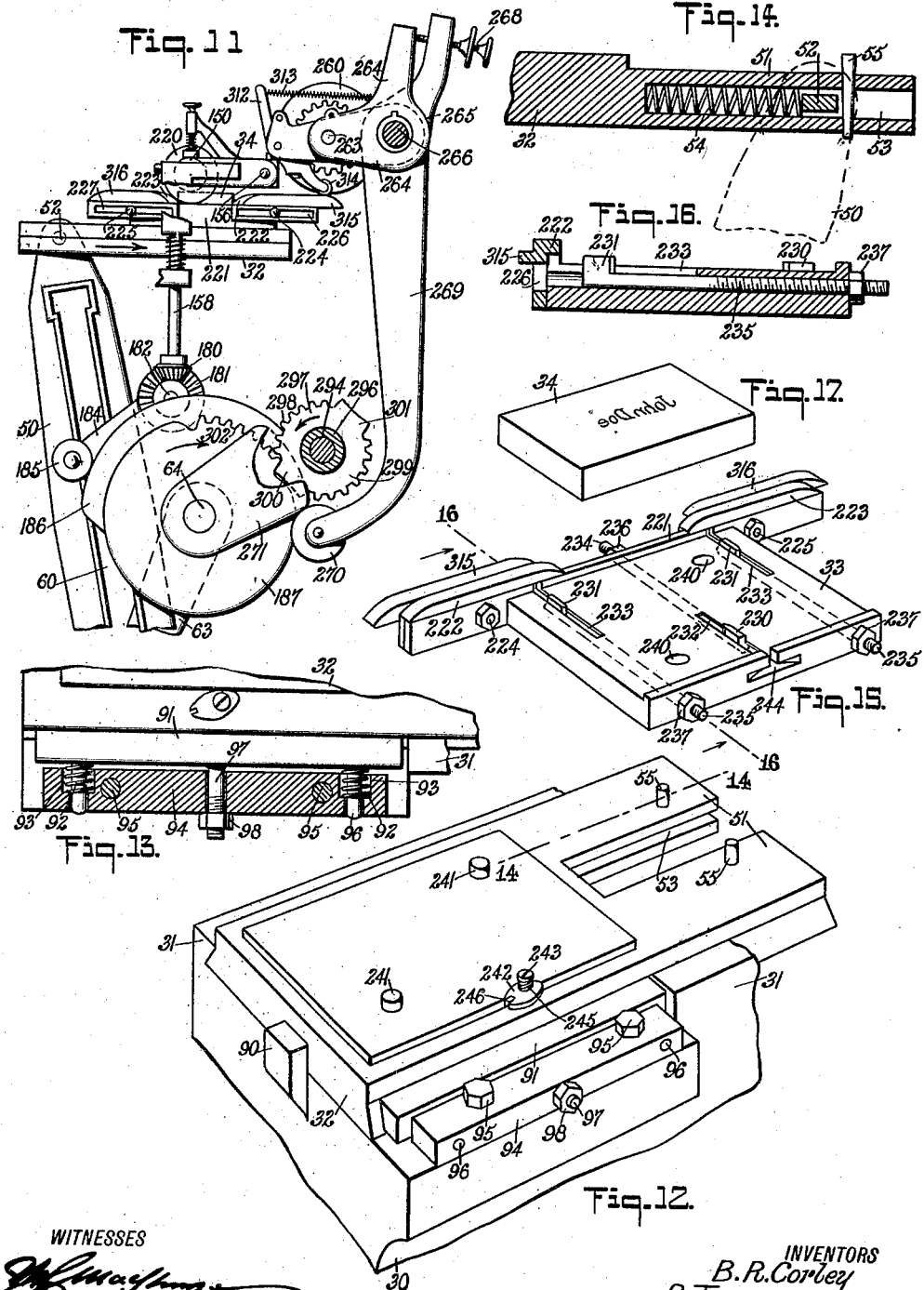

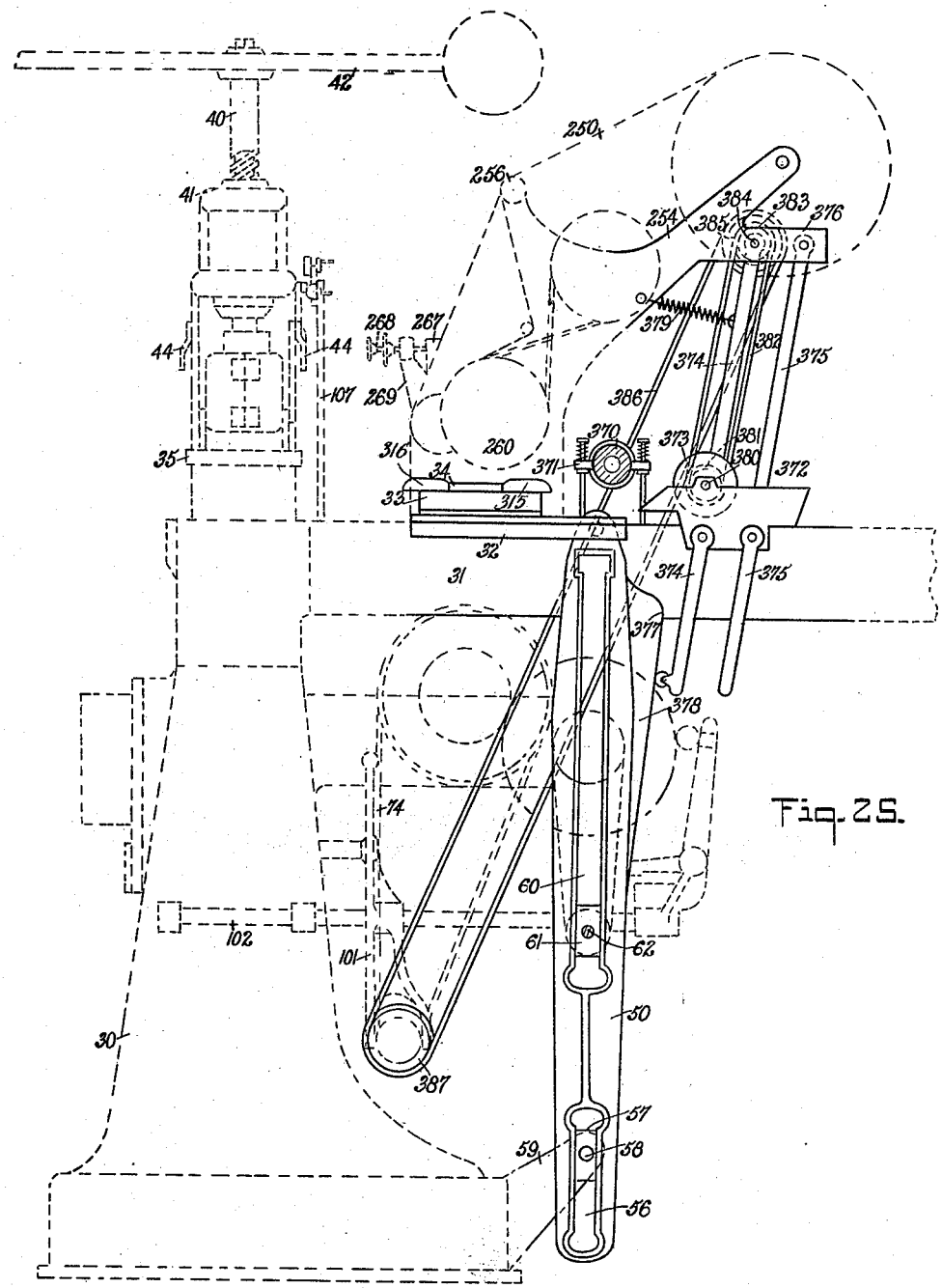

UNITED STATES PATENT OFFICE.

BENJAMIN R. CORLEY, OF BROOKLYN, AND ROBERT TURNER, OF NEW YORK, N. Y.

EMBOSSING AND PRINTING MACHINE.

1,299,133.  Specification of Letters Patent.  Patented Apr. 1, 1919.

Application filed April 24, 1918. Serial No. 230,490.

*To all whom it may concern:*

Be it known that we, BENJAMIN R. CORLEY, a citizen of the United States, and a resident of the city of New York, borough of Brooklyn, in the county of Kings and State of New York, and ROBERT TURNER, a subject of the King of Great Britain, (having declared his intention of becoming a citizen of the United States,) and a resident of the city of New York, borough of Manhattan, in the county and State of New York, have invented a new and Improved Embossing and Printing Machine, of which the following is a full, clear, and exact description.

The invention relates to machines for embossing and printing letterheads, business and visiting cards and other stationery by the use of a die or engraved steel plate.

The object of the invention is to provide a new and improved embossing and printing machine provided with automatic inking and wiping devices arranged to insure a proper inking of the face of the die and clean wiping thereof without requiring any attention on the part of the operator and without waste of the wiping material.

In order to produce the desired result, use is made of a wiping device moving into engagement with the inked face of the die to wipe the same of surplus ink and to simultaneously lift the wiped ink off the die face.

A practical embodiment of the invention is represented in the accompanying drawings forming a part of this specification, in which similar characters of reference indicate corresponding parts in all the views.

Fig. 3 is an elevation of the right-hand side of the embossing and printing machine;

Fig. 4 is a cross section of the same on the line 4—4 of Fig. 1;

Fig. 5 is an enlarged side elevation of the wiping device and showing a portion of the face of the die wiped clean of surplus ink and the wiped ink lifted off the face of the die;

Fig. 6 is a side elevation of the starting mechanism with the parts in position at the time the impression is made;

Fig. 7 is an enlarged rear face view of a portion of the starting mechanism;

Fig. 8 is a perspective view of a portion of the actuating device for the starting mechanism;

Fig. 9 is an enlarged rear elevation, with parts in section, of the inking device, the wiping device and the carriage on the outward stroke;

Fig. 10 is a similar view of the same with the parts in position for the first inking of the die;

Fig. 11 is a similar view of the same with the carriage on the return stroke and the parts in position during the second inking of the die;

Fig. 12 is a perspective view of the carriage and a portion of the guideway on which the carriage is mounted to travel;

Fig. 13 is a plan view of the same with a portion in section;

Fig. 14 is a sectional side elevation of the carriage on the line 14—14 of Fig. 12 and showing more particularly the yielding connection between the carriage and the actuating lever thereof;

Fig. 15 is a perspective view of the die or plate holder;

Fig. 16 is a cross section of the same on the line 16—16 of Fig. 15;

Fig. 17 is a perspective view of the die or plate;

Fig. 18 is a perspective view of the inking device with part of the carriage bed shown in section;

Fig. 19 is a plan view of the inking device and the ink fountain with the inking roller in contact with the fountain roller;

Fig. 20 is an enlarged sectional plan view of the wiping roller and its driving mechanism;

Fig. 21 is a sectional face view of part of the same, the section being on the line 21—21 of Fig. 20;

Fig. 22 is a sectional plan view of a portion of the same with parts in a different position;

Fig. 23 is a rear face view of part of the same;

Fig. 24 is a cross section of a portion of the ink fountain, the section being on the line 24—24 of Fig. 19;

Fig. 25 is a front elevation of a modified form of the inking device as applied;

Fig. 26 is a front elevation of a modified form of the starting device; and

Fig. 27 is a plan view of the same.

Figure 1:
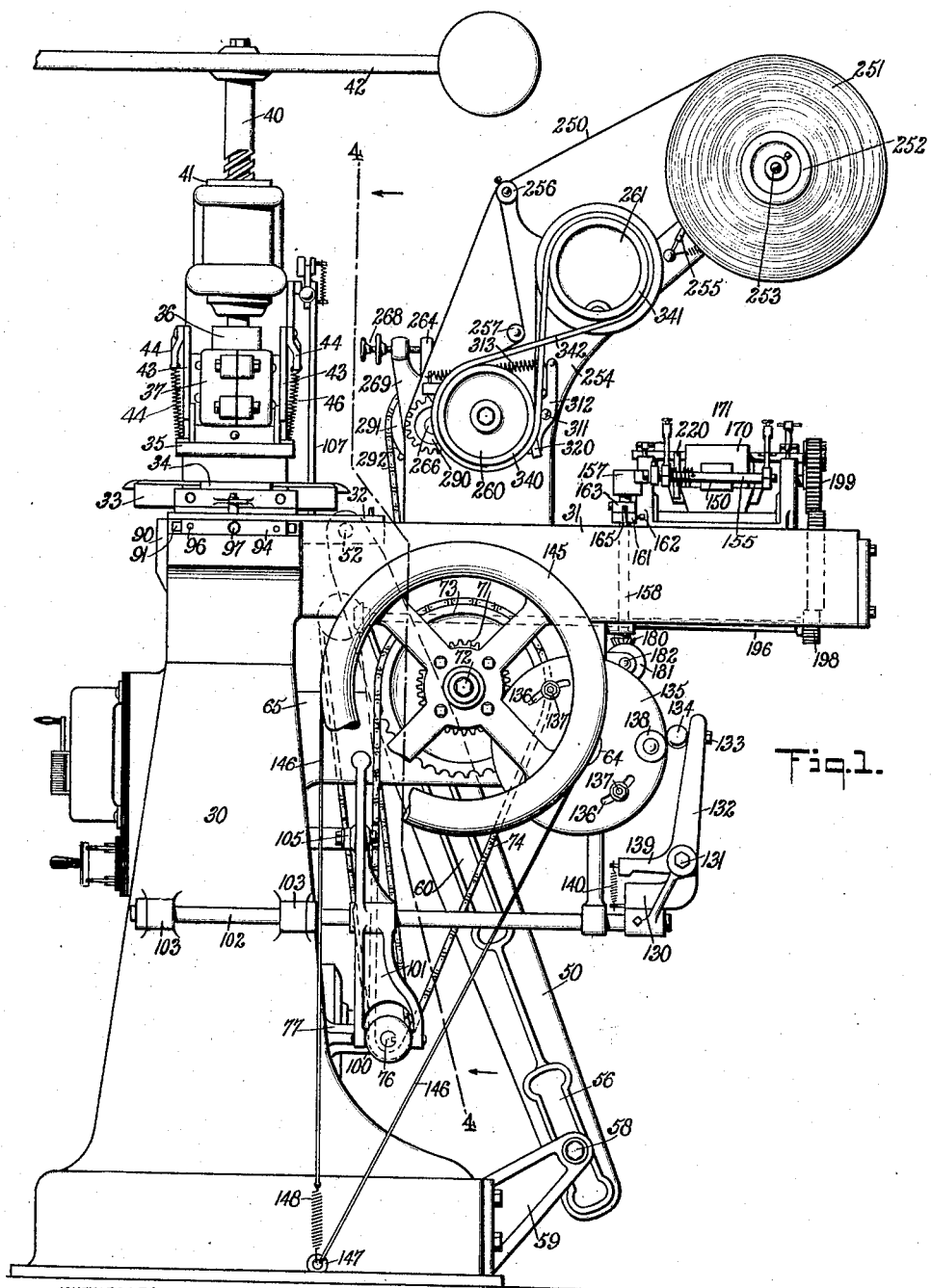
Figure 1 is a front view of the embossing and printing machine with part shown broken out.

In embossing or printing machines, in which the die or engraved slate is wiped by the use of a flat pad either moved across the face of the die or held in position over the face of the moving die, a greater pressure is required to wipe the die as all the ink must be wiped across the die face from one end to the other, causing a greater pressure, and as the ink is forced across the die face it tends to abrade the die face unevenly. With our machine, presently to be described in detail, the die face is inked twice and wiped once automatically prior to making an impression, and the wiping is done in such a manner that the face of the die is wiped clean of ink and the latter is simultaneously lifted off from the die face as the wiping action proceeds. In the accompanying drawings the improved automatic wiping device is shown applied to a hand embossing and printing machine, but we do not limit ourselves to this type of machine as the said automatic wiping device may be applied to automatic and other types of embossing and printing machines.

The main frame 30 of the embossing and printing machine is provided with a sidewise extending bed or guideway 31 on which is mounted to reciprocate intermittently a carriage 32 removably supporting a die holder 33 adapted to carry the die or engraved plate 34 on which the impression is made by the use of a counter or impression plate 35 held on the lower end of a plunger 36 mounted to slide up and down in a suitable guideway 37 attached to or forming part of a bracket 38 (see Fig. 4) attached to or forming part of the main frame 30. The plunger 36 is moved in a vertical direction by the use of the usual screw rod 40 screwing in a nut 41 mounted in the bracket 38, and the upper end of the screw rod 40 is provided with the usual weighted handle 42 under the control of the operator for imparting a turning motion to the screw rod 40 to move the plunger 36 and consequently the impression plate 35 downward to coact with the die 34 to make the impression. The return movement of the impression die 35 and that of its plunger 36 and screw rod 40 is accomplished by the use of links 43 pivotally connecting the plunger 36 with levers 44 fulcrumed at 45 on the bracket 38 and pressed on by springs 46 attached to the said bracket. It is understood that during the downward movement of the impression die 35 the springs 46 are placed under tension, and when the operator releases the handle 42 a return movement is given by the spring pressed levers 44 and links 43 to the impression die 35 and the parts connected therewith.

The carriage 32 has an intermittent reciprocating motion and during the period of rest is below the counter die or plate 35, and in order to impart this movement to the said carriage use is made of an actuating lever 50 extending with its upper end between spaced members 51 forming integral extensions of the right-hand side of the carriage 32 (see Figs. 12 and 14). The upper end of the lever 50 is provided with a transverse pin 52 extending with its ends into longitudinally extending grooves 53 formed on the inner faces of the members 51 and the said ends of the pin 52 bear against springs 54 held in the grooves 53 of the extension members 51 of the carriage 32. By the arrangement described a yielding connection is had between the lever 50 and the carriage 32. Tapering pins 55 are inserted in the extension members 51 to the right of the pin 52 so that the latter can bear against the said pins 55 during the swinging movement to the right of the upper end of the lever 50 with a view to impart a sliding movement from the left to the right to the carriage 32. The lower end of the lever 50 is provided with a guideway 56 in which is mounted to slide a block 57 held on a pivot 58 supported by a bracket 59 attached to the base of the main frame 30. By the arrangement described, the lever 50 is mounted to swing from the pivot 58 as the fulcrum and the lever can slide up and down on the block 57 owing to the connection of the pin 52 with the extension members 51 of the carriage 32. The lever 50 is provided intermediate its upper and lower ends with a guideway 60 in which is mounted to slide a block 61 held on the wrist pin 62 of a crank arm 63 attached to a transverse crank shaft 64 journaled in suitable bearings arranged on brackets 65 forming part of the main frame 30. The forward end of the crank shaft 64 is provided with a gear wheel 70 (see Fig. 3) in mesh with a pinion 71 secured on a transverse shaft 72 journaled on one of the brackets 65. On the shaft 72 is secured a sprocket wheel 73 connected by a sprocket chain 74 with a sprocket wheel 75 mounted to rotate loosely and to slide lengthwise on a transverse shaft 76 (see Fig. 3) journaled in suitable bearings 77 and 78, of which the bearing 77 is mounted on the main frame 30 and the bearing 78 is attached to or forms part of the housing 79 of a motor 80, preferably of the electric type, and attached to the main frame 30. The shaft 76 is provided with a worm wheel 81 in mesh with a worm 82 (see Fig. 2) on the motor shaft 83 of the motor 80 so that when the latter is running a rotary motion is given to the shaft 76.

The sprocket wheel 75 is provided at its rear face with clutch members 84 adapted to engage clutch members 85 secured on the shaft 76, and when the clutch members 84 are in mesh with the clutch members 85 then the rotary motion of the shaft 76 is transmitted by the sprocket wheel 75, sprocket chain 74 and sprocket wheel 73 to the shaft 72, which by the pinion 71 and gear wheel 70 imparts a rotary motion to the crank shaft 64. The rotary motion of the latter imparts a swinging motion to the lever 50 by the action of the crank arm 63. The swinging motion of the lever 50 is transmitted to the carriage 32 to reciprocate the latter on its bed or guideway 31.

The movement of the carriage 32 to the left is limited by a stop 90 arranged on the upper left hand side of the bed 31 and in order to insure a proper firm holding of the carriage 32 at the time it is in this position and at rest use is made of a presser bar 91 (see Figs. 12 and 13) bearing against the front edge of the carriage 32 and pressed on by springs 92 extending within recesses 93 formed on a bar 94 fastened by bolts 95 to the top of the guideway 31, as plainly indicated in Fig. 12. The springs 92 are held on pins 96 attached to the presser bar 91 and guided in the bar 94. A bolt 97 extends from the middle of the presser bar 91 through the bar 94, and on the outer end of this bolt 97 screws a nut 98 abutting against the front of the bar 94 to limit the rearward movement of the presser bar 91. By the arrangement described the die 34 is properly positioned and firmly held in alinement with the counter die 35 at the time the carriage 32 is at rest.

In order to shift the sprocket wheel 75 lengthwise on the shaft 76 with a view to engage with and disengage the clutch members 84 from the clutch members 85, use is made of a shifting collar 100 attached to or forming part of the sprocket wheel 75, and the said shifting collar 100 is engaged by a shifting lever 101 secured on a longitudinally extending rock shaft 102 journaled in suitable bearings 103 arranged on the main frame 30. The upper end of the shifting lever 101 (see Fig. 4) is provided with a transverse stop pin 104 adapted to abut against the front face of the forward bracket 65 to limit the forward sliding movement of the shifting collar 100 and its sprocket wheel 75. The upper portion of the shifting lever 101 is pivotally connected with a transversely extending link 105 pressed on by springs 106 attached to the main frame 30 to normally hold the shifting lever 101 in the position shown in Fig. 4, that is, with the clutch members 84 out of engagement with the clutch members 85. The rear end of the link 105 is pivotally connected with the lower end of a lever 107 fulcrumed at 108 on a bracket 109 projecting rearwardly from the main frame 30, as plainly shown in Fig. 4. The upper end of the lever 107 is provided with an angular extension 110 fitting into a slot 111 formed on one face of a block 112 adjustably secured on the said extension 110 by a screw 113 screwing in the angular extension 110 and extending through an elongated slot 114 formed in the block 112 (see Fig. 7). On the block 112 is secured a forwardly extending rod 115 adapted to be taken hold of at its forward end by the operator to enable the latter (whenever it is desired to do so) to push the rod rearwardly for starting the carriage from its position of rest by throwing the clutch members 84 into engagement with the clutch members 85.

Normally, the carriage, however, is started automatically after the impression is made and the counter or impression die 35 moves into uppermost position, and for this purpose the following arrangement is made, special reference being had to Figs. 4, 6 and 7. The block 112 is provided with a pivot 116 on one end of which is secured a handle 117 pressed on by a spring 118 adapted to rest on either of two stops 119 and 120 forming part of the block 112. On the other end of the pivot 116 is secured a cam arm 121 having its free end provided with a cam 122 adapted to be engaged by a friction roller 123 journaled on an arm 124 forming part of the spring-pressed lever 44 connected by the link 43 with the impression die 35, as previously explained. When the impression die 35 is in uppermost position, as shown in Fig. 4, then the friction roller 123 extends under the cam arm 121, and when the impression die 35 is moved downward on turning the handle 42, as previously explained, then a swinging movement is given to the lever 44 which by the arm 124 and the friction roller 123 imparts an upward swinging movement to the cam arm 121 until the friction roller 123 has passed the free end of the cam arm 121 to allow the latter to swing downward back to its normal position by the action of the spring 118. When the impression die 35 next moves upward then a return swinging movement is given to the lever 44 whereby the friction roller 123 bears on the cam face 122 and thus pushes the arm 121 and with it the block 112 rearwardly thereby imparting a swinging motion to the lever 107 which by the link 105, shifting lever 101 and shifting collar 100 moves the sprocket wheel 75 and its clutch members 84 rearwardly to engage the clutch members 84 with the clutch members 85 rotating with the driven shaft 76. The shaft 64 is now rotated and the crank arm 63 imparts a swinging motion to the lever 50 to reciprocate the carriage 32.

When the carriage has completed its reciprocating movement and the shaft 64 has made one complete revolution then the clutch members 84 are automatically thrown out of engagement with the clutch members 85, and for this purpose the following arrangement is made: On the rear end of the shaft 102 is secured a bracket 130 carrying a transverse stud 131 on which is mounted to swing a lever 132 provided with a stud 133 on which is journaled a ball 134 adapted to engage the peripheral face as well as the front of a disk 135 adjustably secured to the front of the gear wheel 70 secured on the crank shaft 64, as previously explained. The disk 135 is provided with slots 136 engaged by bolts 137 held on the gear wheel 70 to allow of adjusting the disk 135 on the gear wheel 70. On the front face of the disk 135 is journaled a friction roller 138 adapted to engage the ball 134 to push the latter from the front of the disk 135 back onto the peripheral face of the disk after the shaft 64 has made one complete revolution. The lever 132 is provided with an extension arm 139 pressed on by a spring 140 to hold the ball 134 in contact with the peripheral face of the disk 135. The swinging movement of the lever 132 is limited by the extension arm 139 engaging the bracket 130. When the clutch members 84 are thrown into mesh with the clutch members 85 by the action of the friction roller 123 on the cam arm 121, as above explained, then the shifting lever 101 rocks the rock shaft 102 whereby the bracket 130 and with it the lever 132 are swung forwardly to disengage the ball 134 from the peripheral face of the disk 135, and the spring 140 imparts a swinging motion to the lever 132 to engage the ball 134 with the front of the disk 135 immediately after the friction roller 138 has passed the said ball 134. It will be noticed that the ball 134 when in contact with the front of the disk 135 holds the rock shaft 102 against return movement constantly induced by the springs 106 pressing the link 105 connected with the shifting lever 101, consequently the shifting members 84 remain in engagement with the clutch members 85 until the crank shaft 64 has completed a revolution. When the shaft 64 has nearly completed a revolution the friction roller 138 engages the ball 134 and pushes the same outward thus imparting a return swinging movement to the lever 132 until the ball 134 is in register with the peripheral face of the disk 135 thus unlocking the lever 132 relative to the disk 135 and thereby allowing the springs 106, connected with the link 105, to impart a swinging movement to the shifting lever 101 with a view to move the clutch members 84 out of engagement with the clutch members 85 thus stopping the reciprocating movement of the carriage after the crank shaft 64 has made one complete revolution.

In order to prevent a rebounding action of the carriage 32 at the time it reaches the end of its return stroke, use is made of a brake or tension device, preferably in the form of a grooved wheel 145 secured on the shaft 72 and around which passes a band 146 fastened at one end to a fixed eye 147 and connected at its other end with a spring 148 likewise connected with the eye 147, as plainly shown in Fig. 1. The band 146 acts as a brake band on the wheel 145 with sufficient force to prevent a rebounding action of the carriage 32 at the time the latter moves into its resting position.

The printing die 34 is inked twice during the reciprocating movement of the carriage 32, that is, once while the carriage is on the outward stroke and again when the carriage is on the return stroke. For the purpose mentioned use is made of an inking roller 150 of usual composition or other material and having its shaft 151 journaled in bearings 152 (see Fig. 18) held on the lower ends of rods 153 slidingly engaging brackets 154 connected with each other by a sleeve 155 to form a carrying frame for the inking roller 150, the sleeve 155 being mounted to turn on a stud 156 secured on an arm 157 secured on the upper end of a vertical shaft 158 mounted to turn in suitable bearings 159 arranged on the rear side of the guideway 31, as plainly indicated in Figs. 2, 18 and 19. The shaft 158 is pressed by a torsion spring 160, one end of which is fastened to the upper bearing 159 and the other end is attached to a collar 161 fastened by a set screw 162 to the shaft 158 to permit of regulating the tension of the spring 160. On the shaft 158 directly above the collar 161 is secured a stop arm 163 by the use of a set screw 164, and this stop arm 163 is adapted to abut against a stop pin 165 attached to the rear of the guideway 31 to limit the rearward swinging movement of the frame attached to the shaft 158 and carrying the inking roller 150. A torsion spring 166 is coiled on the sleeve 155 and is fastened at one end to the sleeve 155 and engages with its other end a stop pin 167 projecting from the arm 157. The spring 166 serves to swing the roller frame downward, the downward movement of which is limited by the said stop pin 167. Springs 168 are interposed between the brackets 154 and the bearings 152 to mount the inking roller 150 yieldingly in an up and down direction. The spring 160 tends to turn the shaft 158 and the roller frame mounted thereon, together with the roller 150, into such a position that the inking roller 150 is in contact with the fountain roller 170 of a fountain 171 of any approved construction and attached to the rear of the guideway 31. In order to move the inking roller 150 into the path of the printing die 34 to ink the latter it is necessary to give a quarter turn to the shaft 158 to move the inking roller 150 from the position shown in full lines in Fig. 19 into the position shown in dotted lines in the same figure, that is, across the guideway 31, to ink the upper face of the printing die 34 once during the time the carriage travels outward and once while the carriage is on the return movement. In order to impart this periodic rocking movement to the shaft 158 and in unison with the movement given to the carriage 32 the following arrangement is made: On the lower end of the shaft 158 (see Figs. 2, 3, 9, 10 and 11) is secured a bevel pinion 180 in mesh with a bevel gear wheel 181 secured on a transversely extending short shaft 182 (see Fig. 3) journaled in a suitable bearing 183 formed or attached to the rear bracket 65 previously mentioned. On the shaft 182 is secured an arm 184 provided with a friction roller 185 traveling on the peripheral face of a cam 186 attached to or forming part of a mutilated gear wheel 187 secured on the crank shaft 64. When the latter is rotated, as previously explained, then the cam 186 acts on the friction roller 185 to cause the arm 184 to impart a turning motion to the shaft 182 which by the gear wheels 181, 180 turn the shaft 158 to swing the inking roller 150 out of contact with the fountain roller 170 and into the path of the printing plate 31 to ink the latter. When the friction roller 185 drops off the end of the cam 186 then the spring 160 turns the shaft 158 to return the inking roller 150 to rearward position, that is, back into contact with the fountain roller 170.

Figure 2:
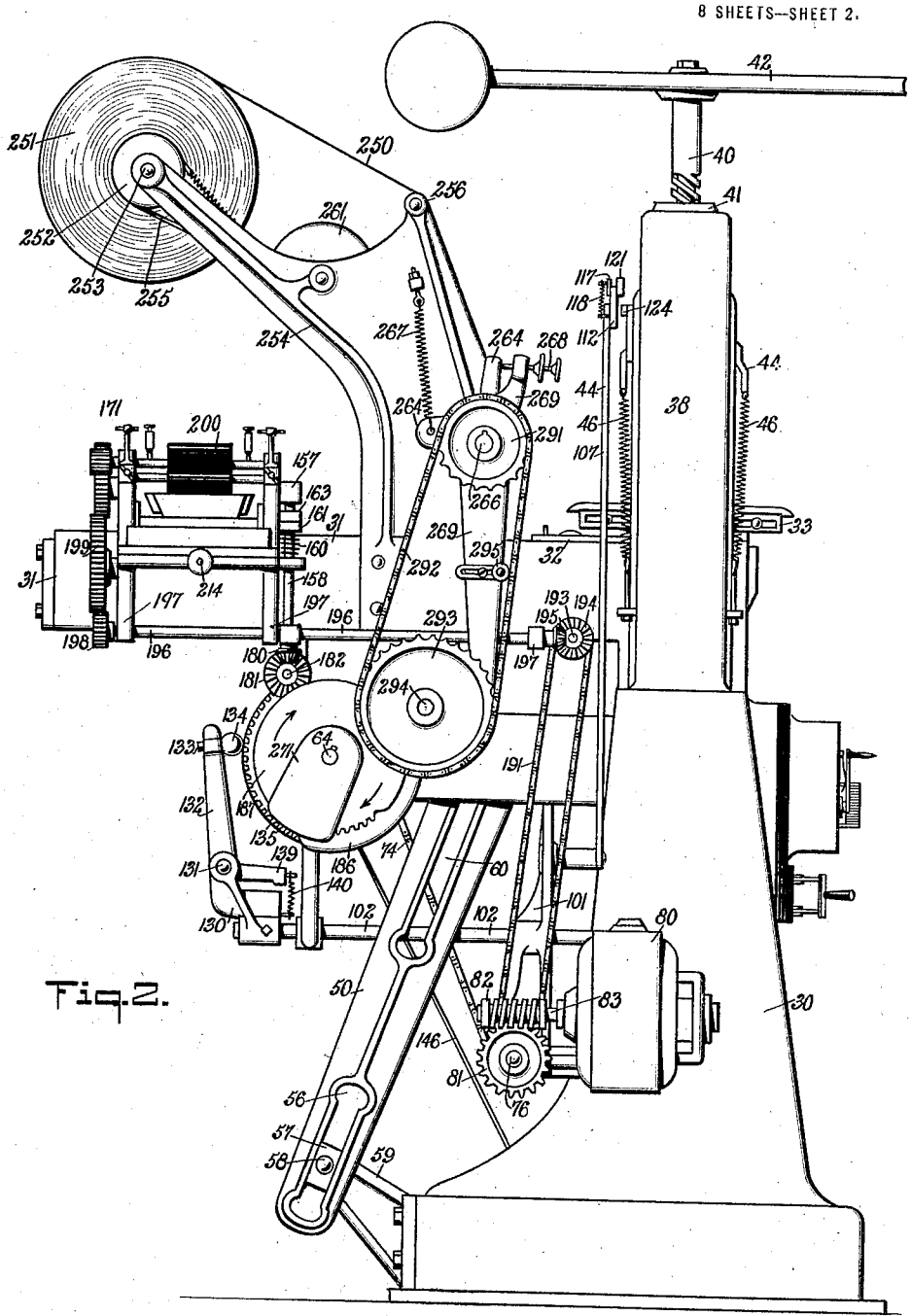
Fig. 2 is a rear elevation of the same.

The fountain roller 170 is continually driven from the motor driven shaft 76 and for this purpose the said shaft 76 is provided with a sprocket wheel 190 connected by a sprocket chain 191 with a sprocket wheel 192 journaled on a stud 193 secured to the rear of the guideway 31 (see Figs. 2 and 4). On the sprocket wheel 192 is secured or formed a bevel gear wheel 194 in mesh with a bevel gear wheel 195 secured on a longitudinally extending shaft 196 journaled in suitable bearings 197 arranged on the rear of the guideway 31. On the end of the shaft 196 is secured a pinion 198 in mesh with one of the gear wheels of a train of gear wheels 199 used for driving the fountain roller 170 and the distributing roller 200 forming part of the ink fountain. As the construction of the ink fountain is practically the same as ink fountains now generally used in printing machines of this and similar types further description of the same is not deemed necessary, it being however understood that when the motor is running and the shaft 76 driven a continuous rotary motion is given to the fountain roller 170 and the distributing roller 200. An ink drip pan 210 of the ink fountain 171 is mounted on the ink fountain frame 211 (see Figs. 2, 19 and 24) mounted to slide transversely on the ink fountain support 212 attached to the guideway 31. The frame 211 is provided with a depending nut 213 in which screws a screw rod 214 mounted to turn in the ink fountain support 212 and is under the control of the operator to permit of properly adjusting the ink fountain 171 forward or rearward according to the direction in which the screw rod 214 is turned, to move the fountain roller 170 into proper relation with the ink roller 150.

It is understood that when the inking roller 150 is swung into contact with the continually rotating fountain roller 170 then the latter imparts a rotary motion to the said inking roller 150 and supplies the latter with ink which is subsequently transferred by the inking roller 150 to the printing face of the printing die 34.

In order to insure proper inking of the upper face of the die plate 34 by the inking roller 150, the following arrangement is made: On the inking roller shaft 151 is mounted to rotate loosely a wheel 220 arranged above a rail 221 secured to the rear of the die holder 33 (see Figs. 15 and 16), and on the ends of the said rail 221 are secured cams 222 and 223 by the use of bolts 224, 225 or other fastening devices. The bolts 224 and 225 pass through slots 226 and 227 (see Fig. 11) formed on the cams 222 and 223 to allow of conveniently adjusting the said cams toward and from each other, on loosening the bolts 224 and 225, according to the width of the printing die 34 used at the time on the die holder 33. The ends of the cams 222 and 223 are rounded off in a downward direction and the inner rounded off ends lead to the top of the rail 221. Now when the carriage 32 travels outwardly the cam 223 comes in contact with the wheel 220 thus lifting the wheel 220 and with it the inking roller 150, and on further outward movement of the carriage 32 the wheel 220 travels downward on the inner end of the cam 223 on the rail 221, and at this time the peripheral face of the inking roller 150 comes in contact with the upper face of the printing die 34 to roll on the latter and ink the same. When the wheel 220 next travels up the inner end of the other cam 222 the inking roller 150 is lifted off the left hand edge of the printing die 34 after the latter has been inked throughout its entire width and length. During the return stroke of the carriage the above described operation is repeated, only in the reverse direction, as far as the travel of the wheel 220 relative to the cams 222 and 223 is concerned. It will be noticed that by the use of the wheel 220 the ink roller 150 is allowed to come in contact with the face of the die just inside of the edge of the die and lifted off the die just before it reaches the other edge of the die, and this distance is controlled by the adjustment of the cams 222 and 223 and prevents the ink from going over the edge of the die.

The printing die 34 is securely held in position on the die holder 33 by a front clamp 230 and two rear clamps 231 (see Fig. 15).

the clamps being mounted to slide transversely in guideways 232 and 233, and the clamps 230 and 231 being provided with screw rods 234, 235 and nuts 236, 237 to permit of adjusting the said clamps and drawing the same tightly against the front and rear edges of the printing die 34 to securely clamp the same in place on top of the die holder 33. The die holder 33 is provided with apertures 240 adapted to engage pins 241 formed on the top of the carriage 32 to hold the die holder 33 in place on the said carriage, and a locking button 242 is mounted on a stud 243 held on the carriage and this button is adapted to engage a recess 244 formed in the front of the die holder 33 to lock the latter in position on the carriage. A spring 245 is coiled on the stud 243 and bears on the button 242 to firmly hold the latter in contact with the die holder 33, and the button is provided with a notch 246 for the insertion of a suitable tool to conveniently turn the button 242 for engaging it with the die holder 33 or disengaging it therefrom whenever it is desired to remove the die holder 33 from the carriage 32.

The inked face of the printing die 34 is wiped during the time the carriage 32 is on the return stroke and the printing die has passed the inking roller 150, and for this purpose use is made of a wiping web 250, of paper or other suitable material. The web 250 is in the form of a roll 251 mounted on an unwinding spool 252 secured on a shaft 253 journaled in a bracket 254 attached to or forming part of the guideway 31. The unwinding spool 252 is provided with a suitable brake band 255 (see Fig. 2) to prevent too fast unwinding of the web 250. The web 250 after leaving the roll 251 passes around guide rollers 256, 257 mounted on the bracket 254 and then the web 250 passes around a wiping roller 260 to then pass onto a winding up roller 261, as plainly shown in Fig. 1. The wiping roller 260 is provided with a peripheral covering 262 of rubber or other suitable material (see Fig. 20) and the said wiping roller is mounted to turn loosely on a stud 263 secured in a lever 264 (see Figs. 9, 10, 11 and 20) secured on a sleeve 265 journaled in the bracket 254 and in which sleeve 265 is journaled a transverse shaft 266. The lever 264 is pulled in an upward direction by a spring 267 and the upper end of the lever 264 is engaged by a set screw 268 screwing on the upper end of a lever 269 mounted to turn loosely on the sleeve 265. The lower end of the lever 269 is provided with a friction roller 270 engaging a cam 271 attached to or forming part of the mutilated gear wheel 187 previously mentioned and secured on the shaft 64. The action of the cam 271 on the friction roller 270 imparts a swinging motion to the lever 269 whereby the wiping roller 260 is caused to swing down or up for the purpose hereinafter more fully described, it being understood that by the use of the additional lever 264 and the set screw 268 an accurate setting of the wiping roller 260 can be obtained.

The wiping roller 260 is positively turned during the time it is in lowermost position and the web 250 is in wiping engagement with the inked face of the printing die 34, and for this purpose the following arrangement is made: The wiping roller 260 is made hollow and is provided at its inner face (see Fig. 20) with a clutch member 280 normally in engagement with a clutch member 281 provided with pins 282 mounted to slide in recesses 283 formed in the hub 284 of a gear wheel 285 mounted to turn loosely on the stud 263 and adapted to slide thereon. The pins 282 are pressed on by springs 286 held in the recesses 283 and the sliding movement of the pins 282 is limited by lugs 287 engaging slots 288 formed in the hub 284, as will be readily understood by reference to Fig. 20. A spring 289 is coiled around the stud 263 and its forward end bears against the inner face of the wiping roller 260 and its rear end bears against the inner wall of the gear wheel 285 to move the clutch members 280 and 281 out of engagement, as hereinafter more fully explained. The gear wheel 285 is in mesh with a gear wheel 290 secured on the shaft 266 previously mentioned, and journaled in the sleeve 265. On the rear end of the shaft 266 is secured a sprocket wheel 291 connected by a sprocket chain 292 with a sprocket wheel 293 mounted to rotate on a stud 294 attached to the rear bracket 65 previously mentioned. The sprocket chain 292 is engaged by a suitable slack taking up device 295 adjustably mounted on the lever 269, as plainly indicated in Fig. 2. The hub 296 of the sprocket wheel 293 is connected with a locking pinion 297 (see Figs. 3, 9, 10 and 11) having two sets of teeth 298 and 299 located diametrically opposite each other and spaced from each other by concave lugs 300 and 301 adapted to engage the peripheral non-toothed portion of the mutilated gear wheel 187, the teeth 302 of which are adapted to mesh alternately with the sets of teeth 298, 299. When the shaft 64 is rotated, as previously explained, then the teeth 302 of the mutilated gear wheel 187 alternately mesh with the teeth 298 and 299 thus imparting a periodical turning motion to the pinion 294 which by the hub 296 rotates the sprocket wheel 293 which by the sprocket chain 292 and the sprocket wheel 291 rotates the shaft 266. The periodic rotary movement given to this shaft 266 causes the gear wheel 290 to rotate the gear wheel 285 at the time the clutch member 281 thereof is in mesh with the clutch member 280 to correspondingly impart a rotary motion to the wiping roller 260. The rotary motion of the wiping roller 260 imparts a traveling motion to the wiping web 250 at the time the said wiping web is in contact with the inked surface of the printing die 34. It is understood that the lever 269, the arms 264 and 310, the sleeve 269 and the stud 236 form a swing frame carrying the wiping roller 260 to move the latter bodily down and up and by the use of the adjustable arm 264 and the set screw 268 the wiping roller 260 can be minutely adjusted up or down to insure a proper contact of the wiping web 250 with the inked surface of the die 34.

In order to move the gear wheel 285 lengthwise of the stud 263 with a view to disengage the clutch member 281 from the clutch member 280, the following arrangement is made, special reference being had to Figs. 20, 21 and 22. On the sleeve 265 is secured an arm 310 through which passes the stud 263. On the free end of the arm 310 is arranged a pivot 311 on which is mounted to swing a lever 312 pressed on at its upper end by a spring 313 attached to the arm 310. The lower end of the lever 312 is provided with a friction roller 314 adapted to engage cams 315 and 316 integral with the cams 222 and 223 mounted on the rail 221 and attached to the die holder 33, as previously mentioned and shown in Fig. 15. The downward swinging movement of the lever 312 is limited by a stop pin 317 on the arm 310. On the lever 312 is adjustably secured a plate 320 provided with a tooth 321 engaging a notch 322 formed in the peripheral face of a disk 323 mounted to rotate loosely on the stud 263. The forward face of the disk 323 engages bearing balls 324 in contact with the rear face of a thrust collar 325 loose on the stud 263 and fitting into a recess 326 formed in the rear end of the gear wheel 285. The rear face of the disk 323 is provided with rollers 327 having their axes coinciding and disposed diametrically of the disk 323. The rollers 327 project beyond the rear face of the disk 323 and are adapted to be seated in seats 328 formed on the front face of the arm 310 and leading to ridges 329 projecting forwardly from the front face of the said arm 310. Normally the rollers 327 are in engagement with the ridges 329, as plainly shown in Fig. 22, so that the gear wheel 285 and with it its clutch members 281 is held in forward position with the clutch member 281 in engagement with the clutch member 280. When the arm 310 is periodically swung downward through the action of the friction roller 270 of the lever 269 and the cam 271, and the roller 314 moves in engagement with the corresponding cam 315 or 316 then the lever 312 is swung upward and in doing so the tooth 321 turns the disk 323 to move the rollers 327 into the seats 328 to allow the spring 289 to push the gear wheel 285 rearwardly on the stud 263 thus disengaging the clutch member 281 from the clutch member 280. Thus during the time the friction roller 314 travels on the cams 315, 316 the wiping roller 260 is not rotated although the gear wheel 290 is rotating at the time and with it the gear wheel 285. When the friction roller 314 passes off the end of the cam 315, then the spring 313 imparts a return swinging movement to the lever 312 whereby the tooth 321 turns the disk 323 in the reverse direction and the rollers 327 pass out of the seats 328 and back onto the ridges 329 thus moving the gear wheel 285 forward to reëngage the clutch member 281 with the clutch member 280 with a view to cause the wiping roller 260 to rotate with the gear wheel 285 driven at the time by the gear wheel 290, until the roller 314 passes up to the end of the cam 316. In doing so the tooth 321 again rotates the disk 323 to move the rollers 327 back into the seats 328, as above described thereby disengaging the clutch members 280 and 281 and thus stopping the rotation of the wiping roller 260. It is understood that this rotary motion of the wiping roller 260 takes place while the roller 314 is between the two cams 315 and 316. In case the clutch members 280 and 281 do not register when the gear wheel 285 slides forward on the stud 263 the clutch member is forced rearward against the tension of the springs 286 until the gear wheel 285 has rotated a sufficient distance to allow the clutch member 281 to register with the clutch member 280 when the springs 286 press the clutch member 281 forward and engage with the clutch member 280. It is also understood that in order to accomplish the desired result as above described, the spring 313 is stronger than the spring 289. In order to properly adjust the tooth 321 on the lever 312 use is made of a screw 330 screwing in the lever 312 and passing through a slot 331 formed in the plate 320 of the tooth 321. It is understood that a periodical swinging movement is given to the lever 269 by the cam 271 acting on the friction roller 270, and a periodical turning movement is given to the gear wheel 290 by the action of the teeth 302 of the mutilated gear wheel 187 on the corresponding set of teeth 298 or 299 of the gear wheel 297 connected with the sprocket wheel 293 which in turn is connected by the sprocket chain 292 and sprocket wheel 291 with the shaft 266 on which the gear wheel 290 is fastened. The rotary motion given to the wiping roller 260 is transmitted to the winding up roller 261 and for this purpose the rollers 260 and 261 are provided with pulleys 340 and 341 connected with each other by a cross belt 342. By the arrangement described the wiping web 250 is wound up and held in firm contact with the wiping roller 260.

A table 350 is preferably mounted on the top of the bed 31 at the left hand side thereof and this table is slotted for the passage of the carriage 32, the die holder 33 and the die 34. The top of the table 350 is approximately level with the printing face of the die 34 to permit the operator to conveniently place the sheet, card or other article to be embossed and printed in position over the die 34 at the time the latter is in a position of rest below the impression die 35.

The operation is as follows:

When the machine is in use and the motor 80 is running and the several parts are in the position shown in Figs. 1, 2, 3 and 4 then the carriage 32 is in its position of rest owing to the fact that the clutch members 84 are held out of engagement with the clutch members 85 by the action of the springs 106 and with the ball 134 in peripheral engagement with the disk 135. With the parts in this position the fountain 171 is the only device active at the time, with the inking roller 150 in contact with the fountain roller 170. The operator now places a sheet to be embossed in position on the top of the table 350 and over the printing face of the printing die 34. The operator now imparts a swinging motion to the handle 42 to move the impression die 35 downward in engagement with the top of the paper to make an impression and as soon as this has been done the operator releases the handle 42 so that the impression die is returned to normal uppermost position by the action of the springs 46 connected with the levers 44 connected by the links 43 with the impression die 35. During the downward movement of the impression die 35 the levers 44 assume the position shown in Fig. 6, and when the impression die 35 returns to uppermost position then the friction roller 123 acts on the cam 121 thereby pushing the upper end of the lever 107 rearwardly and the lower end thereof forwardly so that the link 105 imparts a swinging motion to the shifting lever 101 whereby the clutch members 84 are moved in engagement with the clutch members 85 rotating with the continually driven shaft 76. The rotary motion of the shaft 76 is transmitted to the crank shaft 64, as previously explained, whereby a swinging motion is given to the lever 50 which moves the carriage 32 from the left to the right and back again to starting position, at which time the carriage 32 comes to rest as at this time the clutch members 84 are thrown out of engagement with the clutch members 85 by the action of the springs 106 and the link 105 connecting with the shifting lever 101. It is understood that the crank shaft 64 makes one revolution and during this revolution the ball 134 travels on the face of the disk 135 thus holding the clutch members 84 locked in engagement with the clutch members 85, but immediately prior to the crank shaft 64 completing its revolution the ball 134 is acted on by the friction roller 138 and the lever 132 is swung outward to the right into unlocking position thus allowing the springs 106 to act with a view to move the clutch members 84 out of mesh with the clutch members 85.

During the outward movement of the carriage 32 the friction roller 185 on the arm 184 travels up on the cam 186 (see Fig. 9) and in doing so the shaft 182 is turned and with it the bevel gear wheel 181 whereby the pinion 180 is rotated and with it the shaft 158, that is, the shaft 158 receives a quarter of a turn to swing the arm 157 of the inking roller device forwardly into the position shown in dotted lines in Fig. 19, with the inking roller 150 extending into the path of the oncoming carriage 32. Thus during the outward stroke of the carriage 32 the printing die 34 moves into engagement with the inking roller 150 whereby the said printing die is inked. During the return stroke of the carriage 32 the printing die 34 is again moved into engagement with the inking roller 150 to ink the printing die the second time, and after this has been done the friction roller 185 drops off the end of the cam 186 and the shaft 158 is turned in the reverse direction by the action of the torsion spring 160 to return the inking roller 150 to the fountain roller 170. At about the time the printing die 34 is inked a second time the cam 271 on rotating the crank shaft 64 moves into engagement with the friction roller 270 of the lever 269 thus imparting a swinging motion to the said lever with a view to lower the wiping roller 260, it being understood that the said wiping roller is normally in uppermost position to be out of the way of the carriage 32 and the parts supported thereon during the outward movement of the carriage and during the first portion of the return stroke of the carriage. At about the same time that the wiping roller 260 is swung into lowermost position the gear teeth 302 of the mutilated gear wheel 187 meshes with the set of gear teeth 298 of the wheel 297 to cause a rotation of the wiping roller 260 in the inverse direction in which the carriage is traveling at the time, as will be readily understood by reference to Fig. 5. It is understood that when the wiping roller 260 is swung downward the friction roller 314 moves in contact with the first cam 315 (see Fig. 11) whereby a swinging movement is given to the lever 312 to throw the clutch 281 out of mesh with the clutch 280. The clutches 280, 281 remain out of mesh until the friction roller 314 travels down the inner end of the cam 315. When this takes place the clutch members are again thrown into mesh by the action of the spring 313 on the lever 312. Thus when the bottom of the wiping roller 260 is at the left hand end of the printing die 34 the wiping roller begins to rotate and in doing so the wiping web 250 takes up the ink on the printing face of the die 34 and lifts up the ink owing to the traveling motion given to the wiping web 250. Thus as the carriage 32 is on the return stroke and the printing die 34 has been inked a second time the wiping web 250 is engaged with the inked face of the die 34 to wipe the said die face clean of the surplus ink and to lift such ink, as the wiping proceeds, off the printing face of the die 34. It is especially understood that the wiping web 250 is pressed by the roller 260 with sufficient force into contact with the inked printing face of the die 34 to wipe such face clean of the ink, and as the inked face has approximately the same surface speed as the traveling wiping web 250 and the latter extends upwardly from the bottom of the roller 260, it is evident that all the wiped ink adheres to the wiping web and is lifted off the face of the printing die 34. It will be noticed that the traveling wiping web 250 is in contact with the printing face of the die 34 throughout the width and length thereof and hence the printing face is wiped perfectly clean of ink and the latter is removed by lifting it upward off the die face. After the wiping roller 260 has passed the right hand end of the printing die 34 the friction roller 314 travels up the other cam 316 whereby the clutch member 281 is again thrown out of mesh with the clutch member 280 and further rotation of the wiping roller 260 ceases. Prior to the friction roller 314 leaving the cam 316 the gear wheel 187 has moved out of mesh with the set of teeth 298 and hence further rotation of the gear wheel ceases and the friction roller 270 at this time travels down the cam 271 to return the lever 269 to normal position, as shown in Figs. 9 and 10, whereby the wiping roller 260 is returned to uppermost position. When the carriage 32 finally reaches the end of its return stroke and comes to rest the printing die 34 presents the inked and wiped printing face to the next letter-head, card or the like to be embossed and printed on the next following actuating of the impression device as above explained.

It is understood that for "making ready" purposes it is necessary to actuate the carriage 32 several times and for this purpose the impression device is not used, but the operator presses the rod 115 rearwardly to throw the clutch members 84 into engagement with the clutch members 85 the same as if the friction roller 123 had acted on the cam 121 as previously explained.

It is understood that for printing dies 34 of different width a corresponding adjustment of the cams 222, 315 and 223, 316 is necessary to insure a proper inking and wiping of the face of the printing die. It will also be noticed that the position of the wiping roller 260 farther up or farther down can be varied by the operator adjusting the screw 268 engaging the lever 264 in which is secured the stud 263 carrying the wiping roller 260.

In practice the cams 222, 315 and 223, 316 are adjusted relative to the width of the printing die 34 to cause the inking roller 150 to ink the entire die surface except the side margins, that is, leaving about one eighth of an inch at each side uninked, it being understood that these marginal portions are not engraved and hence require no inking, and if the die would be inked over the edge it would not wipe clean. The wiping roller 260 begins to rotate just before it reaches the left hand side of the die face and continues to rotate until just after it leaves the right hand margin of the die face. This action insures a clean space on the wiping web between adjacent wipings thus preventing smudging of the die by the previous wiping. It will also be noticed that the wiping roller cams 315 and 316 are integral with the inking roller cams 222 and 223 and hence single adjustment is only required for dies of different width. The wiping roller cams 315, 316 are set farther apart than the inking roller cams 222, 223 so that the wiping roller 260 rotates a longer period than the inking roller 150.

The actuating lever 50 for the carriage 32 is mounted to swing and to slide at its lower end so that the upper end of the said lever is not liable to come in contact with the inking roller 150 and the wiping roller 260 during the time the carriage is on the outward and return stroke.

From the foregoing it will be seen that the inking and wiping operations are completely automatic while the impression device is manually controlled, but the inking and wiping devices may be used on machines having an automatic impression device.

The starting mechanism of the carriage 32 controlled by the impression device on the return movement thereof can be thrown out of action by swinging the handle 117 of the cam 122 rearward until it rests on the stop pin 119. The cam 122 is now out of the path of the friction roller 123 and hence the starting lever 107 is not actuated from the impression device but can be actuated by the operator pushing the rod 115 rearwardly.

In the modified forms shown in Figs. 26 and 27 the screw rod 40 of the impression device is provided with an arm 360 having a depending pin 361 adapted to engage the inclined upper end 362 of a lever 363 which takes the place of the lever 107 connected with the link 105 for throwing the clutch members 84 in and out of engagement with the clutch members 85. It will be noticed that when the plunger 36 returns to uppermost position the rebound causes the handle 42 to swing rearwardly beyond normal position, as shown in dotted lines in Fig. 27, and now the pin 361 engages the inclined arm 362 of the lever 363 and thus imparts a rearward swinging movement to the upper end of the same while the lower end thereof moves forward to throw the clutch members 84 into engagement with the clutch members 85 to start the carriage 32 on its outward journey, and the handle 42 of the screw rod 40 returns to normal position by its own weight.

In the modified form shown in Fig. 25 the inking roller 370 extends across the bed or guideway 31 and is journaled in bearings 371 yieldingly mounted on the said guideway. The ink fountain 372 in this case is mounted to move toward and from the inking roller 370 to move the fountain roller 373. For the purpose mentioned the ink fountain 372 is mounted to travel sidewise and is hung on parallel links 374, 375 fulcrumed on an overhead bracket 376 forming part of the bracket 254. The lower end of the link 374 is provided with a friction roller 377 engaging a cam 378 on the actuating lever 50 for the carriage 32 so that when the lever 50 is actuated a forward and backward swinging movement is given to the ink fountain 372. A spring 379 attached to the bracket 254 is connected with the link 374 to hold the friction roller 377 in engagement with the cam 378. The fountain roller 373 has its shaft 380 provided with a pulley 381 connected by a belt 382 with a pulley 383 secured on a shaft 384 which forms the fulcrum for the parallel link 374. On the shaft 384 is secured a pulley 385 connected by a belt 386 with a pulley 387 which takes the place of the sprocket wheel 75 to impart a turning motion to the fountain roller 373 during the travel of the carriage 32. It is understood that in the present case the fountain roller 373 travels toward and from the inking roller 370 instead of the inking roller 150 traveling toward or from the fountain rollers 200, as previously explained.

Having thus described our invention, we claim as new and desire to secure by Letters Patent:—

1. In an embossing and printing machine, an impression device having a vertical reciprocating movement, a carriage having an intermittent sidewise movement and provided with a die holder adapted to support a die coacting with the said impression device to make an impression at the time the die is below the impression device and the carriage is at rest, an actuating lever for the said carriage, a crank shaft having its crank connected with the said lever to impart a swinging motion thereto, a driven shaft, a transmission gear connected with the said crank shaft and provided with a clutch adapted to connect and disconnect the transmission gear with the said driven shaft, and controlling means for the said clutch and controlled from the said impression device at the time the latter is on the return or upward stroke to throw the said clutch into gear.

2. In an embossing and printing machine, an impression device having a vertical reciprocating movement, a carriage having an intermittent sidewise movement and provided with a die holder adapted to support a die coacting with the said impression device to make an impression at the time the die is below the impression device and the carriage is at rest, an actuating lever for the said carriage, a crank shaft having its crank connected with the said lever to impart a swinging motion thereto, a driven shaft, a transmission gear connected with the said crank shaft and provided with a clutch adapted to connect and disconnect the transmission gear with the said driven shaft, controlling means for the said clutch and controlled from the said impression device at the time the latter is on the return or upward stroke to throw the said clutch into gear, and an automatic locking device controlled from the said crank shaft and connected with the said clutch controlling means to lock the latter in place during one revolution of the said crank shaft and to unlock the said clutch controlling means after the crank shaft has made one revolution to allow the said controlling means to throw the clutch out of gear.

3. In an embossing and printing machine, a reciprocating carriage adapted to support a printing die, a wiping roller, a wiping web passing around the said roller and adapted to move into contact with the face of the said printing die, a stud on which the said wiping roller is journaled, a cam controlled lever, a spring-pressed arm adjustably connected with the said cam controlled lever and carrying the said stud, and means rotating the said wiping roller while the web is in contact with the face of the die.

4. In an embossing and printing machine, a reciprocating carriage adapted to support a printing die, a wiping roller, a wiping web passing around the said roller and adapted to move into contact with the face of the said printing die, a stud on which the said wiping roller is journaled, a cam controlled lever, a spring-pressed arm carrying the said stud and provided with a sleeve on which the said lever is mounted to rock, a set screw screwing in the said lever and engaged by the said arm, and means rotating the said wiping roller while the web is in contact with the printing die to cause the wiping web to wipe the ink and lift it off the die face.

5. In an embossing and printing machine, a reciprocating carriage adapted to support a printing die and provided with spaced cams on opposite sides of the printing die, a wiping roller, a wiping web passing around the said roller and adapted to engage the inked face of the said printing die, a stud on which the said wiping roller is journaled, means to lower and raise the said stud and the wiping roller to move the wiping web into engagement with the face of the printing die and driving means for the said wiping roller, and a clutch mechanism connecting the said wiping roller with the said driving means and controlled by the said cams.

6. In an embossing and printing machine, a reciprocating carriage adapted to support a printing die and provided with spaced cams on opposite sides of the printing die, a wiping roller, a wiping web passing around the said roller and adapted to engage the inked face of the said printing die, a stud on which the said wiping roller is journaled, means to lower and raise the said stud and the wiping roller to move the wiping web into engagement with the face of the printing die, a driven gear wheel mounted to turn on the said stud, a spring-pressed clutch mechanism adapted to connect the said driven gear wheel with the said wiping roller, and a spring-pressed lever provided with a friction roller connected with the said clutch mechanisms and adapted to engage the said cams.

7. In an embossing and printing machine, a reciprocating carriage adapted to support a printing die and provided with spaced cams on opposite sides of the printing die, a wiping roller, a wiping web passing around the said roller and adapted to engage the inked face of the said printing die, a stud on which the said wiping roller is journaled, means to lower and raise the said stud and the wiping roller to move the wiping web into engagement with the face of the printing die, a driven gear wheel mounted to turn and to slide on the said stud, a clutch having one member on the said driven gear wheel and the other on the said wiping roller, a thrust bearing loose on the said stud and engaging the said driven gear wheel, the thrust bearing being provided on one of its members with a roller, a cam face having a seat and a ridge adapted to be alternately engaged by the said roller and a spring-pressed arm having a tooth and a friction roller of which the tooth engages the said thrust bearing member carrying the roller and the said friction roller is adapted to engage the said cams.

8. In an embossing and printing machine, a reciprocating carriage adapted to support a printing die and provided with spaced cams on opposite sides of the printing die, a wiping roller, a wiping web passing around the said roller and adapted to engage the inked face of the said printing die, a stud on which the said wiping roller is journaled, means to lower and raise the said stud and the wiping roller to move the wiping web into engagement with the face of the printing die, a driven gear wheel mounted to turn and to slide on the said stud, a clutch having one member on the said driven gear wheel and the other on the said wiping roller, a thrust bearing loose on the said stud and engaging the said driven gear wheel, the thrust bearing being provided on one of its members with a roller, a cam face having a seat and a ridge adapted to be alternately engaged by the said roller, a spring-pressed arm having a tooth and a friction roller, of which the tooth engages the said thrust bearing member carrying the roller and the said friction roller is adapted to engage the said cams, and a spring interposed between the said wiping roller and the driven gear wheel, the spring being weaker than the spring of the said spring-pressed arm.

9. In an embossing and printing machine, a reciprocating carriage adapted to carry a printing die, an intermittently driven crank shaft connected with the said carriage to reciprocate the latter, a cam on the said crank shaft, a swing frame controlled by the said cam, a wiping roller mounted on the said swing frame and normally above the plane of the said printing die, and a wiping web passing around the said wiping roller and adapted to engage the face of the said printing die on imparting a swinging motion to the said swing frame.

10. In an embossing and printing machine, a reciprocating carriage adapted to carry a printing die, an intermittently driven crank shaft connected with the said carriage to reciprocate the latter, a cam on the said crank shaft, a swing frame controlled by the said cam, a wiping roller mounted on the said swing frame and normally above the plane of the said printing die, and a wiping web passing around the said wiping roller and adapted to engage the face of the said printing die on imparting a swinging motion to the said swing frame, and an intermittent driving gear driven intermittently from the said crank shaft and connected with the said wiping roller to rotate the latter at the time the wiping roller is moved into lowermost position by the action of the said swing frame.

11. In an embossing and printing machine, a reciprocating carriage adapted to carry a printing die, an intermittently driven crank shaft connected with the said carriage to reciprocate the latter, a cam on the said crank shaft, a swing frame controlled by the said cam, a wiping roller mounted on the said swing frame and normally above the plane of the said printing die, a wiping web passing around the said wiping roller and adapted to engage the face of the said printing die on imparting a swinging motion to the said swing frame, an intermittent driving gear driven intermittently from the said crank shaft and connected with the said wiping roller to rotate the latter at the time the wiping roller is moved into lowermost position by the action of the said swing frame, cams on the said carriage, and a clutch mechanism controlled by the said cams and connected with the said driving gear.

12. In an embossing and printing machine, a reciprocating carriage adapted to carry a printing die, an intermittently driven crank shaft connected with the said carriage to reciprocate the latter, a cam on the said crank shaft, a swing frame controlled by the said cam, a wiping roller mounted on the said swing frame and normally above the plane of the said printing die, a wiping web passing around the said wiping roller and adapted to engage the face of the said printing die on imparting a swinging motion to the said swing frame, a mutilated gear wheel on the said crank shaft, a mutilated pinion periodically in mesh with the said mutilated gear wheel, a countershaft connected with and driven from the said pinion, a gear wheel secured on the said countershaft, and a second gear wheel adapted to rotate the said wiping roller and in mesh with the said first named gear wheel.

13. In an embossing and printing machine, a reciprocating carriage adapted to carry a printing die, an intermittently driven crank shaft connected with the said carriage to reciprocate the latter, a cam on the said crank shaft, a swing frame controlled by the said cam, a wiping roller mounted on the said swing frame and normally above the plane of the said printing die, a wiping web passing around the said wiping roller and adapted to engage the face of the said printing die on imparting a swinging motion to the said swing frame, a mutilated gear wheel on the said crank shaft, a mutilated pinion periodically in mesh with the said mutilated gear wheel, a countershaft connected with and driven from the said pinion, a gear wheel secured on the said countershaft, a second gear wheel adapted to rotate the said wiping roller and in mesh with the said first named gear wheel, a cam on the said carriage, a clutch mechanism adapted to connect the said second gear wheel with the said wiping roller, and controlling mechanism for the said clutch mechanism and controlled by the said carriage cams.

14. In an embossing and printing machine, an impression device having a vertical reciprocating movement, a carriage having an intermittent sidewise movement and provided with a die holder adapted to support a die coacting with the said impression device to make an impression at the time the die is below the impression device and the carriage is at rest, an actuating lever for the said carriage, a crank shaft having its crank connected with the said lever, to impart a swinging motion thereto, a driven shaft, a transmission gear connected with the said crank shaft and provided with a clutch adapted to connect and disconnect the transmission gear with the said driven shaft, controlling means for the said clutch and controlled from the said impression device at the time the latter is on the return or upward stroke to throw the said clutch into gear, the said clutch controlling means including an actuating member on the said impression device, a shifting lever, and a starting lever connected with the said shifting lever, and controlled by the said member on the impression device.

15. In an embossing and printing machine, an impression device having a vertical reciprocating movement, a carriage having an intermittent sidewise movement and provided with a die holder adapted to support a die coacting with the said impression device to make an impression at the time the die is below the impression device and the carriage is at rest, an actuating lever for the said carriage, a crank shaft having its crank connected with the said lever to impart a swinging motion thereto, a driven shaft, a transmission gear connected with the said crank shaft and provided with a clutch adapted to connect and disconnect the transmission gear with the said driven shaft, controlling means for the said clutch and controlled from the said impression device at the time the latter is on the return or upward stroke to throw the said clutch into gear, the said controlling means including an actuating member on the said impression device, a shifting lever, a starting lever connected with the said shifting lever, and a cam arm pivoted on the said starting lever and adapted to be engaged by the said actuating member at the time the impression device moves into uppermost position.

16. In an embossing and printing machine, an impression device having a vertical reciprocating movement, a carriage having an intermittent sidewise movement and provided with a die holder adapted to support a die coacting with the said impression device to make an impression at the time the die is below the impression device and the carriage is at rest, an actuating lever for the said carriage, a crank shaft having its crank connected with the said lever, to impart a swinging motion thereto, a driven shaft, a transmission gear connected with the said crank shaft and provided with a clutch adapted to connect and disconnect the transmission gear from the said driven shaft, controlling means for the said clutch and controlled from the said impression device at the time the latter is on the return or upward stroke to throw the said clutch into gear, the said controlling means including a friction roller on the said impression device, a shifting lever, a starting lever, a link connecting the said levers with each other, a block adjustably secured on the said starting lever, and a cam arm pivoted on the said block and adapted to be engaged by the said friction roller.

17. In an embossing and printing machine, a reciprocating carriage adapted to carry a printing die, an actuating lever connected with the said carriage, a crank shaft connected with the said lever, a driven shaft provided with a clutch member, a driving gear connection connected with the said crank shaft and having a shiftable clutch member adapted to engage the said shaft clutch member, a shifting lever for the said shiftable clutch member, a rock shaft on which the said shifting lever is secured, a lever fulcrumed on the said rock shaft and provided with a ball, and a disk driven from the said crank shaft and provided on its face with a friction roller adapted to engage the said ball, the latter being adapted to travel on the periphery and on the face of the said disk, and means connected with the said shifting lever to actuate the same.

18. In an embossing and printing machine, a carriage mounted to reciprocate and adapted to carry a printing die, actuating means reciprocating the said carriage intermittently, an impression device adapted to coact with the said printing die at the time the carriage is at rest, and a brake device engaging the said actuating means to prevent rebounding of the carriage at the time it reaches its position of rest.

19. In an embossing and printing machine, a carriage mounted to reciprocate and adapted to carry a die, an impression device coacting with the said die to make an impression, an intermittently driven crank shaft, a lever engaged by the crank of the said crank shaft and connected with the said carriage, a brake wheel on the said crank shaft, and a brake band engaging the said brake wheel.

BENJAMIN R. CORLEY.
ROBERT TURNER.

Copies of this patent may be obtained for five cents each, by addressing the "Commissioner of Patents, Washington, D. C."